United States Patent
Kunitomo et al.

(10) Patent No.: US 8,354,091 B2
(45) Date of Patent: Jan. 15, 2013

(54) ALUMINA POWDER AND METHOD FOR PREPARING THE SAME AS WELL AS USE THEREOF

(75) Inventors: Osamu Kunitomo, Fukuoka (JP); Takaaki Tanaka, Fukuoka (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 210 days.

(21) Appl. No.: 12/447,660

(22) PCT Filed: Oct. 31, 2006

(86) PCT No.: PCT/JP2006/321772
§ 371 (c)(1),
(2), (4) Date: Apr. 29, 2009

(87) PCT Pub. No.: WO2008/053536
PCT Pub. Date: May 8, 2008

(65) Prior Publication Data
US 2010/0051855 A1 Mar. 4, 2010

(51) Int. Cl.
*C01F 7/00* (2006.01)
(52) U.S. Cl. ........................................ 423/625
(58) Field of Classification Search .................. 423/625
See application file for complete search history.

(56) References Cited

U.S. PATENT DOCUMENTS

| 4,193,768 | A | * | 3/1980 | Ohishi et al. ................. 23/301 |
| 4,315,839 | A | * | 2/1982 | Bouge et al. ................. 502/8 |
| 4,382,879 | A | * | 5/1983 | Funabashi et al. ........... 502/407 |
| 5,340,781 | A | * | 8/1994 | Oda et al. .................... 501/127 |
| 6,106,800 | A | | 8/2000 | Mohri et al. |
| 6,261,484 | B1 | * | 7/2001 | Phillips et al. ................ 264/5 |
| 2004/0007789 | A1 | | 1/2004 | Vlach et al. |

FOREIGN PATENT DOCUMENTS

| CN | 1398714 A | | 2/2003 |
| EP | 0276321 | * | 8/1988 |
| JP | 63 16038 | | 1/1988 |
| JP | 7 133109 | | 5/1995 |
| JP | 7 206433 | | 8/1995 |
| JP | 9 86924 | | 3/1997 |
| JP | 2001 19425 | | 1/2001 |
| JP | 2001 199719 | | 7/2001 |
| JP | 2005 209765 | | 8/2005 |
| JP | 2005 281063 | | 10/2005 |
| JP | 2006 169090 | | 6/2006 |
| KR | 10-2006-0129466 | | 12/2006 |
| WO | 02/098796 | * | 12/2002 |
| WO | 2005/087665 | * | 9/2005 |

OTHER PUBLICATIONS

U.S. Appl. No. 12/990,328, filed Oct. 29, 2010, Tanaka, et al.
Office Action issued Nov. 2, 2010, in Chinese Patent Application No. 200680056248.3.
Vallet-Regi, M. et al., "Control of structural type and particle size in alumina synthesized by the spray pyrolysis method", Solid State Ionics, Elsevier, vol. 101-103, pp. 197-203, (1997).

* cited by examiner

Primary Examiner — Steven Bos
(74) Attorney, Agent, or Firm — Oblon, Spivak, McClelland, Maier & Neustadt, L.L.P.

(57) ABSTRACT

Herein disclosed is alumina powder incorporated into a composition which should have excellent heat conduction and used as a heat-radiating member and for sealing a semiconductor. The spherical α-alumina powder has an average sphericity of not less than 0.93 and a content of α-crystalline form is not less than 95% and the spherical α-alumina powder is prepared according to the method, which comprises the steps of: (1) softening metallic aluminum powder or alumina powder through the treatment with a flame; (2) solidifying the softened powder by passing the same through a zone maintained at a temperature ranging from 800 to 500° C.; (3) increasing the content of α-phase by passing the solidified powder through a zone maintained at a temperature ranging from 950 to 1,500° C.; and (4) collecting the resulting powdery product while cooling the same.

3 Claims, 1 Drawing Sheet

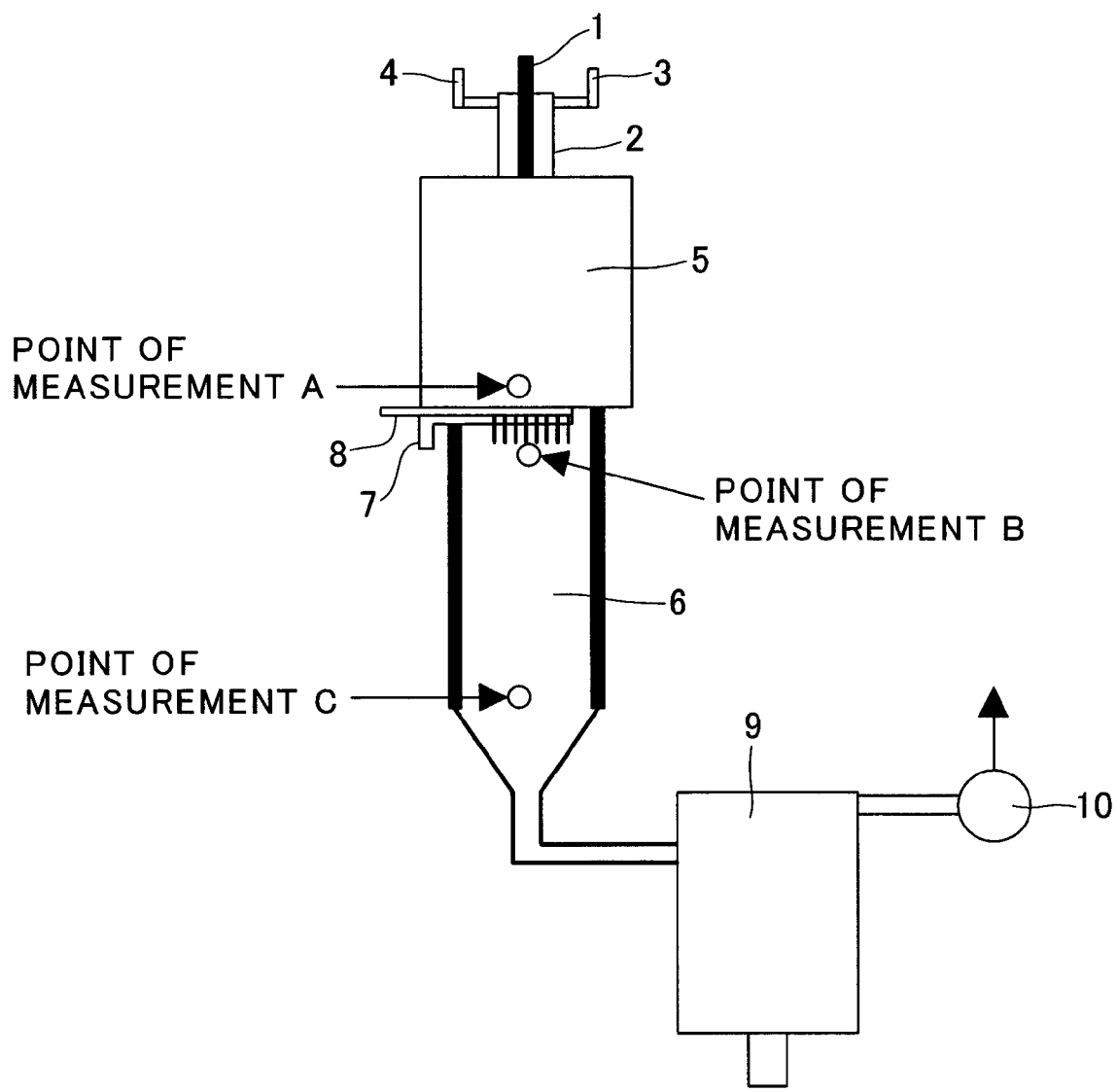

ALUMINA POWDER AND METHOD FOR PREPARING THE SAME AS WELL AS USE THEREOF

TECHNICAL FIELD

The present invention relates to alumina powder, a method for the preparation thereof and the use thereof.

BACKGROUND ART

Recently, the amount of heat generated by, for instance IC devices increases steadily as the progression of the miniaturization and speedup of electronic machinery and tools and accordingly, it has been required for a heat-radiating member used around the surroundings of heat-generating parts of the devices to have further improved heat-radiation characteristics. In response to this, there has been under study the use of a resin or rubber filled with alumina powder as one of such heat-radiating members.

Alumina is present in a variety of crystalline states such as α, β, δ, γ and θ-crystalline states, but α-alumina can suitably be used as a material for a heat-radiating member among others, since it has the highest heat conduction. However, α-alumina powder is in general in the forms free of any crushed shapes or cut edges (or in the form of edge-free shapes or round shapes). For this reason, in the existing circumstances, it cannot be incorporated into resins or rubber at a high density or in a large amount and thus one cannot make the most use of the high heat conduction of α-alumina. In addition, a problem also arises such that these α-alumina powdery products may severely be worn out, for instance, the machinery and tools used in the blending thereof with resins or the like such as kneaders and rolls and pumps used for transporting a composition including, for instance, a resin as well as a mold or the like used for molding the composition.

For this reason, there have variously been investigated the use of spherical alumina powder.

In the meantime, spherical alumina powder is prepared according to a technique fundamentally comprising a step of melting a raw material of alumina through heating the same with a flame and the resulting alumina powder is in crystalline states such as δ, θ, γ, and β-crystalline state, which are inferior in the heat conduction to α-state. For instance, Patent Document 1 (specified below) discloses a method for preparing spherical α-alumina powder, but the results of the supplementary examinations of the method carried out by the inventors of this invention indicate that the content of α-alumina in the resulting product is 85% and a problem thus arises such that the method provides only a product having an average sphericity on the order of at highest 0.91 as expressed in terms of the evaluated value of the sphericity as will be described later. In addition, Patent Document 2 (specified below) discloses a method for preparing pseudo-spherical particles through the agglomeration of fine α-alumina particles, but the method of this literature simply provides, in the existing state, α-alumina powder whose average sphericity is at highest about 0.80.

Patent Document 1: JP-A-2001-019425;
Patent Document 2: JP-A-9-086924.

DISCLOSURE OF THE INVENTION

Subject to be Attained by the Invention

Accordingly, it is an object of the present invention to provide α-alumina powder whose average sphericity is not less than 0.93 and in which the content of α-crystalline form is not less than 95%. It is another object of the present invention to provide a method for preparing α-alumina powder having such characteristic properties as well as a composition obtained by incorporating the resulting α-alumina powder into, for instance, a resin.

More specifically, the following are herein provided according to the present invention:

1. α-Alumina powder characterized in that it has an average sphericity of not less than 0.93 and it has a content of α-crystalline form is not less than 95%.

2. A method for preparing α-alumina powder which has an average sphericity of not less than 0.93 and a content of α-crystalline form is not less than 95%, characterized in that the method comprises the steps of:

(1) softening metallic aluminum powder or alumina powder through the treatment with a flame;

(2) solidifying the softened powder by passing the same through a region maintained at a temperature ranging from 800 to 500° C.;

(3) increasing the content of α-phase by passing the solidified powder through a region maintained at a temperature ranging from 950 to 1,500° C.; and (4) collecting the resulting powdery product while cooling the same.

3. A heat conductive composition comprising a resin or rubber, which contains α-alumina powder having an average sphericity of not less than 0.93 and a content of α-crystalline form of not less than 95%, incorporated into the resin or the rubber.

Means for Attaining the Subject

The inventors of this invention have conducted intensive studies to obtain α-alumina powder having a very high sphericity and a high content of α-crystalline form, have thus found that spherical α-alumina powder having an enhanced content of α-crystalline form can be prepared by a method which comprises the steps of heat-treating metallic aluminum powder or alumina powder by applying a flame thereto to thus soften the same, guiding it to a collection system while cooling the same to thus recover alumina powder, wherein the alumina powdery product heat-treated with a flame is once passed through a region or zone maintained at a temperature ranging from 800 to 500° C. to thus solidify the heat-treated powdery product and further passed through a region or zone maintained at a higher temperature ranging from 950 to 1,500° C. and have thus completed the present invention.

Effects of the Invention

The present invention permits the production of spherical α-alumina powder having an average sphericity of not less than 0.93 and a content of α-crystalline form or a rate of α-phase (crystalline form) of not less than 95%. Moreover, if the α-alumina powder having such characteristic properties is incorporated into a resin or rubber, the resulting blend containing the alumina powder may have a high alumina density. Moreover, the α-alumina powder of the present invention has a high content of α-crystalline form and this accordingly results in the production of, for instance, a resin composition which is excellent in the heat conduction and which is thus quite useful as a heat-radiating material used in the production of, for instance, IC devices.

BEST MODE FOR CARRYING OUT THE INVENTION

The present invention will be described in more detail below.

The α-alumina powder according to the present invention has such characteristic properties as an average sphericity of not less than 0.93 and a content of α-crystalline form on the order of not less than 95%.

If the α-alumina powder of the present invention is incorporated into, for instance, a resin or rubber, the resulting composition does not have an extremely high viscosity, the powder can be incorporated into, for instance, a resin in a large amount and the powder is likewise excellent in the flow properties, since the powder has an average sphericity of not less than 0.93. Accordingly, the α-alumina powder of the present invention is quite useful when molding, for instance, a resin containing α-alumina powder in a mold.

The average sphericity of the α-alumina powder of the present invention is preferably equal to or higher than 0.95. Particularly preferred is one having an average sphericity of almost equal to the upper limit or 1.00. From the practical stand point, it may be possible to prepare α-alumina particles having an average sphericity very close to that of the complete sphere. In this connection, the higher the average sphericity of the α-alumina particles, the higher the flow properties thereof and the risk of causing any abrasive wear of a variety of machinery and tools would be substantially reduced.

In this regard, the average sphericity of the α-alumina powder of the present invention is determined and defined according to the following methods:

Micrographs of alumina particles are taken using a scanning electron microscope (Model JXA-8600M available from JEOL Ltd.) at a magnification of ×500 for alumina particles having a particle size of not less than 30 μm, ×3000 for alumina particles having a particle size of not less than 5 μm and less than 30 μm, ×5000 for alumina particles having a particle size of not less than 1 μm and less than 5 μm, and ×50000 for alumina particles having a particle size of less than 1 μm, the projected area (A) and the peripheral length (perimeter: PM) of the particles are determined on the basis of the secondary electron-reflected images (SEM micrograph images) and these data are substituted in the following equation to thus determine the desired average sphericity.

In other words, if the area of the true circle corresponding to the perimeter (PM) of a particle is assumed to be (B), the sphericity of the particle can be represented by the following relation: A/B. In this respect, if assuming a true circle having a peripheral length identical to the perimeter (PM) of a sample particle, parameters PM and B can be expressed as follows: $PM=2\pi r$ and $B=\pi r^2$, and therefore, the following relation holds: $B=\pi \times (PM/2\pi)^2$. Consequently, the sphericity of this particle is as follows: Sphericity=$A/B=A \times 4\pi/(PM)^2$. Thus, the sphericity is determined for 100 particles arbitrarily selected from the SEM micrograph images and the average of these measurements is defined to be the average sphericity.

If the content of the α-crystalline form in alumina powder is less than 95%, the resulting composition of, for instance, a resin may only slightly be improved in its heat conduction even if such α-alumina powder can be incorporated into the composition in a high density and therefore, the composition is insufficient for use as a heat-radiating material having high heat-radiation properties. The most preferred is α-alumina powder having a content of α-crystalline form almost equal to the upper limit thereof or an α-alumina content of 100%.

The α-alumina powder used herein is preferably one free of any crystalline phase other than the α-phase, but it would include, for instance, δ-alumina and θ-alumina as inevitable components in an amount of at highest 5% and even if such inevitable components are mixed in the α-alumina powder used herein, this never causes any problem in the practice of the present invention at all.

The rate of the α-alumina phase is determined in a powder X-ray diffraction device using Cu—K a rays according to the following method: The measurement was carried out using a powder X-ray diffractometer (for instance, "JDX-3500" available from JEOL Ltd.) and a scintillation counter as a detector under the following conditions of measurement: an applied voltage of 40 kV; an electric current of 300 mA; diverging slit: 1 deg.; scattering slit: 1 deg.; light-receiving slit: 0.2 mm. The measurement was carried out at a step angle of 0.02 deg./step and a measuring time of 0.5 sec/step according to the 2 θ·θ scanning technique. In addition, the measuring range was set at a level of 2 θ=30 to 50 degs. In the first place, the calibration curve is prepared. Samples herein used for preparing such a calibration curve were α-alumina (available from Kanto Chemical Co., Ltd. under the trade name of "Aluminum Oxide (α-type)") and δ-alumina (available from Denki Kagaku Kogyo K.K. under the trade name of "ASFP-20"). The calibration curve was prepared through the use of 11 sample powders obtained by blending α-alumina and δ-alumina in mixing ratios of 0:100, 1:99, 3:97, 5:95, 7:93, 10:90, 20:80, 50:50, 75:25, 90:10 and 0:100 and plotting the results on the X-Y coordinates, with the peak area of the (113) face on the X-axis and the rate of α-alumina on the Y-axis. Then, each sample powder was inspected for the peak area (Y) of the (113) face and substituted in the following equation: Rate of α-Alumina (% by mass)=[Y−(the intercept of the calibration curve)]/(the gradient of the calibration curve) to thus obtain the rate of α-alumina.

The particle size of spherical α-alumina powder may vary depending on its use and the method for using the same. For instance, when it is used as a heat-radiating material, the particle size thereof is up to the level corresponding to the thickness of the heat-radiating material and it ranges, for instance, from 0.01 to 50 μm in case where the thickness of the heat-radiating material is 0.1 mm, while if it is used in an epoxy resin composition as an IC device-sealing material, the particle size preferably ranges from 0.01 to 100 μm.

Then a preferred embodiment of the method for preparing spherical α-alumina powder according to the present invention will be described below in more detail with reference to the accompanying drawings.

FIG. 1 shows a device preferably used for the production of the spherical α-alumina powder according to the present invention. A heating device (6) for re-heating solidified powder body is arranged below a furnace (5) for forming a flame and a collecting device (9) for collecting the resulting spherical α-alumina powder is likewise positioned below the heating device. On the other hand, a burner (2) for forming a flame and a raw material-supply port (1) are positioned above the furnace (5). The furnace (5) may be either a vertical or horizontal type one.

The raw powder used herein may be metallic aluminum powder, alumina powder or a mixed powder thereof. The use of metallic aluminum powder would permit the production of ultrafine powdery product. The use of alumina powder, for instance, raw alumina powder having a particle size of 50 μm would permit the production of spherical α-alumina powder whose particle size is on the order of 50 μm. The raw powder may be supplied to the furnace in its dried powdery form or may be supplied thereto after it is converted into a slurry in a medium such as an alcohol or water. In the present invention, it is preferably supplied to the furnace while it is accompanied by or entrained with a carrier gas such as oxygen or air.

The flame can be formed by combusting a combustion gas such as hydrogen gas, natural gas, acetylene gas, propane gas and/or butane gas injected to the furnace through a combustion gas-supply port (3) while supplying a combustion-improving gas such as air or oxygen gas through a combustion-improving gas-supply port (4). It is herein suitable that the flame temperature is set at a level of, for instance, not less than 1800° C. and preferably not less than 2100° C. The upper limit of the flame temperature may be increased to a level of, for instance, up to 2500° C. The raw powder subjected to such a heat-treatment with a flame is softened and melted, is then passed through a zone maintained at a temperature ranging from 500 to 800° C. and preferably 680 to 780° C. to thus solidify the molten raw material into spherical alumina powder and then the solidified raw material is further introduced into a heating device (6). In this respect, it would be quite important in the present invention that the product heat-treated with a flame is once passed through a zone maintained at a temperature ranging from 500 to 800° C. and then passed through a zone maintained at a temperature ranging from 950 to 1500° C. and preferably 1050 to 1500° C. or more specifically subjected to a re-heating treatment in a heating device maintained at that temperature.

In the present invention, the temperature prior to the re-heating treatment is set at a level of 500 to 800° C. for the following reason: if the softened or melted raw material is introduced into the heating device (6), while the material is still maintained at a temperature higher than 800° C., the heat-treated product is insufficiently solidified and this accordingly never results in the recovery of alumina powder whose average sphericity is not less than 0.93. While if the temperature prior to the re-heating treatment is less than 500° C., the δ-crystalline phase and θ-crystalline phase of the resulting alumina powder are stabilized, this leads to the occurrence of a shape change of the alumina powder during the re-heating step and this also never results in the formation of alumina powder having an average sphericity of not less than 0.93. It is preferred in the present invention that the residence time of the heat-treated product in the zone having a temperature ranging from 500 to 800° C. is not less than $1.0 \times 10^{-3}$ sec and preferably not less than 0.1 sec. This residence time can be controlled by appropriately adjusting the gas-flow rate in the furnace.

The atmosphere in the heating device (6) is maintained at a temperature ranging from 950 to 1500° C. This temperature control is carried out by any external heating means, for instance, gas combustion or heating with an electric heater through the furnace wall. In the apparatus as shown in FIG. 1, the temperature control is carried out by the gas combustion system using gases supplied through a combustion gas-supply port (7) and a combustion-improving gas-supply port (8). It is preferred in the present invention that supply ports for the mixed gas comprising a combustion gas and a combustion-improving gas are uniformly arranged in a number as great as possible to prevent any local heating. In this respect, if the atmospheric temperature of the heating device is less than 950° C., the alumina powder does not easily undergo the phase-transition into its α-phase, while if it exceeds 1500° C., particles may be fused and combined together to thus adversely affect the average sphericity of the resulting alumina powder. It is preferred in the invention to set, at a level of not less than 1.0 sec, the residence time of the solidified alumina powder in the zone maintained at a temperature ranging from 950 to 1500° C. This residence time can be controlled by the gas-flow rate in the furnace.

The spherical α-alumina powder passed through the heating device (6) is recovered by a collecting device (9) and only the exhaust gas is discharged through, for instance, a blower (10). Such a collecting device usable herein includes, for instance, a gravity-settling chamber, a cyclone which makes use of a centrifugal separator or a bug filter.

The spherical α-alumina powder of the present invention is incorporated into, for instance, a resin to thus give a composition which can be used in a variety of applications.

Examples of rubber materials suitably used herein include silicone rubber, urethane rubber, acrylic rubber, butyl rubber, ethylene-propylene rubber, urethane rubber, and ethylene-vinyl acetate copolymer. On the other hand, examples of resins suitably used herein include epoxy resin, silicone resin, phenol resin, melamine resin, urea resin, unsaturated polyester, fluorine atom-containing resin, polyimide, polyamide such as polyamide-imide and polyether-imide, polyesters such as polybutylene terephthalate and polyethylene terephthalate, polyphenylene sulfide, wholly aromatic polyester, polysulfones, liquid crystalline polymer, polyether sulfone, polycarbonate, maleimide-modified resin, ABS resin, AAS (acrylonitrile-acrylic rubber/styrene) resin, and AES (acrylonitrile/ethylene/propylene/diene rubber-styrene) resin.

It is suitable that the alumina powder according to the present invention is preferably incorporated into, for instance, a resin in an amount of, for instance, 50 to 95% by mass and, in particular, 70 to 93% by mass.

Among these resins or the like, preferably used in the field of the heat-radiating material are, for instance, silicone resins whose organo-polysiloxane backbone is composed of dimethylsiloxane units and silicone resins whose organo-polysiloxane backbone comprises, for instance, vinyl groups, phenyl groups, and trifluoro-propyl groups incorporated therein. Moreover, if the heat-radiating material is highly flexible one having an ASKER C hardness of less than 25, preferably used herein are addition reaction type liquid silicone rubber such as those obtained through addition reactions of addition-reactive type liquid silicone rubber such as a one-pack type addition reactive silicone having both vinyl and H—Si groups in a molecule, or through addition reactions of two-pack type addition reaction type silicone comprising organo-polysiloxane carrying vinyl groups at terminals or on side chains (liquid A) and organo-polysiloxane carrying at least two H—Si groups at terminals or on side chains (liquid B).

The base polymer used herein and constituting such a one-pack type addition reactive silicone or a two-pack type addition reactive silicone has, in its backbone, organic groups such as methyl, phenyl and trifluoro-propyl groups. It is preferred that the mixing ratio of addition reactive vinyl groups and H—Si groups ranges from 0.5 to 3 mole equivalents and preferably 1 to 2 mole equivalents of H—Si group per one mole of vinyl group from the viewpoint of the curing speed of the resulting rubber and the physical properties of the rubber after the curing of the same. Moreover, in the addition reaction of the addition reactive liquid silicone rubber, a catalyst for the addition reaction can be used for the acceleration of the addition reaction and specific examples thereof include platinum atom-containing catalysts such as Pt, platinum black, chloroplatinic acid, alcohol-modified chloroplatinic acid, and a complex of chloroplatinic acid and an olefin.

Specific examples of such addition reactive liquid silicone rubber include "TSE3070" and "TSE3051" available from Toshiba Silicone Co., Ltd. or "SE1880", "SE1885A/B", "SE1886A/B", "SE1887A/B", "SE4440A/B", "SE1891KA/B", and "CY52-283A/B" available from Toray Silicone Co., Ltd.

When using the composition in the form of a resin composition for sealing semiconductors, preferably used include epoxy resins each carrying at least two epoxy groups in a molecule. Specific examples thereof include phenol-novolak type epoxy resins, o-cresol-novolak type epoxy resins, those obtained by converting novolak resins consisting of phenols and aldehydes into epoxy derivatives, glycidyl ethers such as bisphenol A, bisphenol F and bisphenol S, glycidyl ester acid epoxy resins obtained through the reaction of polybasic acids such as phthalic acid and dimer acid with epichlorohydrin, linear aliphatic epoxy resins, alicyclic epoxy resins, heterocyclic epoxy resins, alkyl-modified polyfunctional epoxy resins, β-naphthol-novolak type epoxy resins, 1,6-dihydroxynaphthalene type epoxy resins, 2,7-dihydroxynaphthalene type epoxy resins, bishydroxy-biphenyl type epoxy resins, and further epoxy resins into which halogen atoms such as bromine atoms are introduced to thus impart flame retardancy to the resins. Among them, preferably used herein include, for instance, o-cresol-novolak type epoxy resins, bishydroxy-biphenyl type epoxy resins, and epoxy resins having naphthalene skeletons, from the viewpoint of the moisture-resistant properties and the solder-reflow resistant properties.

The curing agent for curing the epoxy resin is not restricted to any particular one insofar as it can react with the epoxy resin to thus cure the same and examples thereof include novolak type resins obtained by reacting at least one member selected from the group consisting of, for instance, phenol, cresol, xylenol, resorcinol, chlorophenol, t-butylphenol, nonylphenol, isopropyl-phenol, and octylphenol with formaldehyde, para-formaldehyde or p-xylene in the presence of an oxidation catalyst, poly(p-hydroxystyrene) resins, bisphenol compounds such as bisphenol A and bisphenol S, trifunctional phenols such as pyrogallol and fluoroglucinol, acid anhydrides such as maleic anhydride, phthalic anhydride and pyromellitic anhydride, and aromatic amines such as m-phenylene-diamine, diaminodiphenyl-methane and diaminodiphenyl-sulfone.

A curing accelerator may be used for the acceleration of the reaction of epoxy resins and curing agents for curing the same. As such curing accelerators, there may be listed, for instance, 1,8-diazabicyclo(5,4,0) undecene-7, triphenyl phosphine, benzyldimethyl-amine, and 2-methylimidazole.

The following components may, if necessary, be incorporated into the composition containing the spherical α-alumina powder of the present invention. More specifically, a silane-coupling agent can be used and examples thereof include epoxy silanes such as γ-glycidoxypropyl-trimethoxysilane and β-(3,4-epoxy-cyclohexyl)ethyl-trimethoxy-silane; aminosilanes such as aminopropyl-triethoxysilane, ureidopropyl-triethoxysilane and N-phenylaminopropyl-trimethoxysilane; hydrophobic silane compounds such as phenyltrimethoxy-silane, methyltrimethoxy-silane, and octadecyltrimethoxy-silane; mercapto-silane; surface-treating agents such as Zr-chelates, titanate coupling agents and aluminum atom-containing coupling agents; flame-retardant improvers such as $Sb_2O_3$, $Sb_2O_4$, and $Sb_2O_5$; flame-retardant agents such as halogenated epoxy resins and phosphorus atom-containing compounds; and coloring agents such as carbon black, iron oxide, dyes and pigments. Moreover, a releasing agent such as a wax may likewise be added to the composition and specific examples thereof are naturally occurring waxes, synthetic waxes, metal salts of linear fatty acids, acid amides, esters, and paraffin. In particular, when the composition is required to have highly reliable moisture resistance and high stability when the composition is allowed to stand at a high temperature, it is effective to add a variety of ion-trapping agents. Examples of commercially available ion-trapping agents include those sold by Kyowa Chemical Co., Ltd. under the trade name of DHF-4A, KW-2000, KW-2100, and those sold by Toagosei Chemical Industry Co., Ltd. under the trade name of "IXE-600".

EXAMPLES

Now, the present invention will be described in more detail with reference to, for instance, the following Examples and Comparative Examples, but the scope of the present invention is not limited to, for instance, these Examples and Comparative Examples at all.

Examples 1 to 5, Comparative Examples 1 to 6 and Reference Examples 1 to 2

Spherical α-alumina powder products were prepared using the vertical device as shown in FIG. 1.

A heating device (6) having a size of 400 mm (diameter)×5000 mm (height) was connected to the lower end of a furnace (5) having a size of 500 mm (diameter)×2000 mm (height). The heating device (6) is provided with combustion gas (propane gas)-supply pipes (7) and combustion-improving gas (oxygen gas)-supply pipes (8), which are branched into 20 pairs. A bag filter was used as a collecting device (9).

There were supplied, to the furnace, propane gas (LPG) through a combustion gas-supply port (3) of a burner (2) and oxygen gas, as a combustion-improving gas, through a combustion-improving gas-supply port (4) to thus form a flame (having a temperature of not less than 2000° C.) (the temperature was determined at the center of the flame and at the distance, 200 mm, from the tip of the burner (2)). The formation of the flame was carried out by supplying LPG at a discharge rate of not less than 20 m/sec through a combustion gas-supply port (a slit thickness of 1 mm) arranged at the outer periphery of the discharge opening of a raw material-supply port (1) connected to the center of the burner at the tip thereof; and further supplying oxygen gas at a discharge rate of not less than 5 m/sec through a combustion-improving gas-supply port (a slit thickness of 10 mm) arranged at the outer periphery of the discharge opening of a combustion gas-supply port. Each powdery raw material in the form of its dried powder and detailed in the following Table 1 was fed, at a flow rate of 30 kg/hr, to the furnace through the raw material-supply port (1) while the powder was entrained with oxygen gas in a flow rate of 25 $Nm^3$/hr. The atmospheric temperatures of a zone maintained at a temperature ranging from 800 to 500° C. and a zone maintained at a temperature ranging from 950 to 1500° C. were determined at the following three points: point of measurement A (situating at the outlet of the furnace) (the position situating at the distance of 4900 mm from the upper face of the furnace (5) in FIG. 1); point of measurement B (situating at the inlet of the heating device (6) and more specifically, at the boundary between the furnace (5) and the heating device (6)); and point of measurement C (situating at the outlet of the heating device (6)). There were used, in these measurements, a commercially available K-thermocouple within the temperature range of from 0 to 600° C. and a commercially available B-thermocouple within the temperature range of from 600 to 1700° C. (both of them are available from Chino Corporation).

The conditions for the heat-treatment are summarized in the following Table 2. The following Table 3 shows characteristic properties of the alumina powdery products recovered from the bag filter. In this connection, Table 3 also shows the characteristic properties of crushed alumina "AS-50" commercially available from Showa Denko, K.K. (average particle size: 10 μm) as Reference Example 1 and crushed alumina "AA-05" commercially available from Sumitomo Chemical Co., Ltd. (average particle size: 0.6 μm) as Reference Example 2.

TABLE 1

| Raw Powder 1 | Amorphous alumina powder (average particle size: 50 μm) |
| Raw Powder 2 | Amorphous alumina powder (average particle size: 3 μm) |
| Raw Powder 3 | Metal aluminum powder (average particle size: 10 μm) |

TABLE 2

| | Raw Powder | Amt. supplied to furnace (Nm³/hr) | | Re-heating device (Nm³/hr) | |
| --- | --- | --- | --- | --- | --- |
| | | LPG | Oxygen gas | LPG | Oxygen gas |
| Ex. 1 | 1 | 10 | 50 | 5 | 25 |
| Ex. 2 | 1 | 15 | 75 | 5 | 25 |
| Ex. 3 | 1 | 10 | 50 | 3.5 | 10.5 |
| Ex. 4 | 2 | 10 | 50 | 5 | 25 |
| Ex. 5 | 3 | 3 | 15 | 5 | 25 |
| Comp. Ex. 1 | 1 | 20 | 100 | 3 | 15 |
| Comp. Ex. 2 | 1 | 7 | 35 | 5 | 25 |
| Comp. Ex. 3 | 1 | 10 | 50 | 2 | 10 |
| Comp. Ex. 4 | 1 | 15 | 75 | 8 | 40 |
| Comp. Ex. 5 | 2 | 10 | 50 | 0 | 0 |
| Comp. Ex. 6 | 3 | 3 | 15 | 0 | 0 |

| | Temperature at point of measurement (° C.) | | | Residence time (sec) | |
| --- | --- | --- | --- | --- | --- |
| | A | B | C | 550-900° C. | 950-1500° C. |
| Ex. 1 | 552 | 1348 | 1047 | 1.1 | 3.6 |
| Ex. 2 | 748 | 1451 | 1103 | 0.7 | 2.7 |
| Ex. 3 | 550 | 1101 | 987 | 1.1 | 4.5 |
| Ex. 4 | 558 | 1346 | 1047 | 1.2 | 3.7 |
| Ex. 5 | 750 | 1462 | 1048 | 3.5 | 6.1 |
| Comp. Ex. 1 | 909 | 1448 | 1105 | 0.0 | 2.3 |
| Comp. Ex. 2 | 432 | 1092 | 980 | 1.4 | 5.0 |
| Comp. Ex. 3 | 553 | 879 | 680 | 1.2 | 0.0 |
| Comp. Ex. 4 | 746 | 1647 | 1539 | 0.7 | 0.0 |
| Comp. Ex. 5 | 555 | 501 | 296 | 1.3 | 0.0 |
| Comp. Ex. 6 | 730 | 680 | 350 | 3.3 | 0.0 |

TABLE 3

| | Average Particle Size (μm) | Average Sphericity (-) | Rate of α-Phase (%) |
| --- | --- | --- | --- |
| Ex. 1 | 51 | 0.94 | 98.2 |
| Ex. 2 | 52 | 0.96 | 100.0 |
| Ex. 3 | 51 | 0.95 | 96.3 |
| Ex. 4 | 11 | 0.98 | 97.1 |
| Ex. 5 | 0.6 | 0.98 | 96.5 |
| Comp. Ex. 1 | 55 | 0.88 | 100.0 |
| Comp. Ex. 2 | 51 | 0.87 | 98.0 |
| Comp. Ex. 3 | 51 | 0.94 | 79.8 |
| Comp. Ex. 4 | 52 | 0.89 | 100.0 |
| Comp. Ex. 5 | 11 | 0.98 | 28.0 |
| Comp. Ex. 6 | 0.6 | 0.98 | Not less than 1.0 |
| Ref. Ex. 1 | 10 | 0.85 | 100.0 |
| Ref. Ex. 2 | 0.6 | 0.87 | 100.0 |

According to Examples 1 to 5, there were prepared alumina powdery products each having a high average sphericity and a high rate of α-phase as compared with those observed for the alumina powdery products prepared in Comparative Examples 1 to 6.

Then the alumina powdery products prepared in Examples 1 to 4 and Comparative Examples 1 to 4 were blended with resins to prepare resin compositions and the resulting compositions were inspected for the following physical properties, according to the following methods.

An epoxy resin, a curing agent, a curing-accelerator, a releasing agent and a silane-coupling agent were blended together in a mixing ratio specified in the following Table 4, subsequently each resulting blend was admixed with the foregoing alumina powder at a charging rate of 65% by mass and then each resulting blend was kneaded with heating in a normal mating type twin-screw extrusion-kneader (screw diameter, D: 25 mm; kneading disk length: 10D mm; rotational number of paddle: 150 rpm; discharge rate: 4.5 kg/hr; heater temperature: 105 to 110° C.). The discharged product was cooled in a cooling press, then pulverized to give each composition and the resulting composition was inspected for the heat conductivity, spiral flow and amount of abrasive wear of mold according to the following methods. The results thus obtained are summarized in the following Table 5.

(1) Heat Conductivity:

A composition was poured into a mold provided with a hollow having a diameter of 28 mm and a thickness or depth of 3 mm, the composition was then degassed and molded at 150° C. for 20 minutes to give a molded body and the resulting molded body was inspected for the heat conductivity using a heat conductivity-determining device (commercially available from AGNE Company under the trade name of "ARC-TC-1 Model") at room temperature according to the temperature-gradient technique to thus determine the heat conductivity of the molded body.

(2) Spiral Flow

The spiral flow was determined using a spiral flow mold according to the method specified in EMMI-66 (Epoxy Molding Material Institute; Society of Plastic Industry). In this measurement, the mold temperature was set at 175° C., the molding pressure was set at 7.4 MPa and the pressure-maintaining time was set at 90 seconds.

(3) Abrasive Wear of Mold

A composition which was heated to 175° C. was passed through a hole of an aluminum disk, which had a thickness of 6 mm and a hole diameter of 3 mm, in an amount of 150 cm³ using a pressure extruder and the weight loss of the disk was determined and the result thus obtained was defined to be the abrasive wear.

TABLE 4

| | Kind of Material | Rate of Mixing (% by mass) |
| --- | --- | --- |
| Epoxy resin | o-Cresol/novolak type one (available from Nippon Kayaku Co., Ltd.) | 63.8 |
| Curing agent | Phenol/novolak resin ("PSM-4261" available from Gunei Chemical Co., Ltd.) | 32.1 |
| Curing Accelerator | Triphenyl phosphine (available from Hokko Chemical Co., Ltd.) | 0.6 |
| Releasing agent | Montanic acid ester ("WaxEflakes" available from KURARI & Japan Co., Ltd.) | 3.5 |
| Silane coupling agent | Organo-silane ("KBM403" available from Shin-Etsu Chemical Co., Ltd.) | 0.4 relative to alumina powder |

TABLE 5

|  | Heat conductivity (W/mK) | Spiral Flow (m) | Abrasive wear of mold (mg) |
|---|---|---|---|
| Ex. 1 | 4.3 | 1.1 | 2.2 |
| Ex. 2 | 4.5 | 1.2 | 2.2 |
| Ex. 3 | 4.2 | 1.1 | 2.1 |
| Comp. Ex. 1 | 4.2 | 0.6 | 8.8 |
| Comp. Ex. 2 | 4.1 | 0.7 | 6.9 |
| Comp. Ex. 3 | 3.0 | 1.1 | 2.1 |
| Comp. Ex. 4 | 4.3 | 0.8 | 7.1 |

Furthermore, resin compositions used for forming heat-radiating members were prepared through the use of the alumina powder products prepared in Example 4, Comparative Example 5 and Reference Example 1 (all of them had an average particle size of 10 μl m or 11 μm); or the alumina powdery products obtained in Example 5, Comparative Example 6 and Reference Example 2 (all of them had an average particle size of 0.6 μm) according to the following procedures and then the resulting resin compositions were inspected for the physical properties likewise according to the following methods.

Two-component addition reactive liquid silicone rubber products ("YE5822 Liquid A" and "YE5822 Liquid B" available from GE Toshiba Silicone Co., Ltd.), alumina powder and a retarder were blended in a mixing ratio specified in the following Table 6 and the resulting compositions were inspected for the following physical properties. The results obtained using the alumina powdery products prepared in Example 4, Comparative Example 5 and Reference Example 1 are summarized in the following Table 7, while the results obtained using the alumina powdery products prepared in Example 5, Comparative Example 6 and Reference Example 2 are summarized in the following Table 8.

(4) Heat Conductivity of Heat Radiating Member

To the silicone rubber liquid A, there were repeatedly added and stirred, in order, the retarder, the alumina powder and the silicone rubber liquid B and then the resulting mixture was degasses. The resulting liquid sample was poured into a mold provided with a hollow having a diameter of 28 mm and a thickness or depth of 3 mm, the mixture was then degassed and molded at 150° C. for 20 minutes to give a molded body and the resulting molded body was inspected for the heat conductivity according to the temperature-gradient technique to thus determine the heat conductivity of the molded body. In this respect, used herein as the measuring device was a heat conductivity-determining device commercially available from AGNE Company under the trade name of "ARC-TC-1 Model."

(5) Viscosity

The silicone rubber composition prepared above and prior to molding with heating was subjected to viscosity measurement using a B-type viscometer ("DB-10" available from DAIWA Kenko Co., Ltd.) at 30° C. and at a rotational number of 20 rpm.

(6) Abrasive Wear of Mold

The silicone rubber composition prepared above and prior to molding with heating was passed through a hole of an aluminum disk, which had a thickness of 6 mm and a hole diameter of 3 mm, in an amount of 150 cm³ using an ordinary temperature-pressure extruder and the weight loss of the disk was determined and the result thus obtained was defined to be the abrasive wear.

TABLE 6

|  | Rate of Incorporation (% by mass) | |
|---|---|---|
| Kind of Material | Ex. 4, Comp. Ex. 5, Ref. Ex. 1 | Ex. 5, Comp. Ex. 5, Ref. Ex. 1 |
| Silicone rubber Liquid A; available from GE Toshiba Silicone Co., Ltd. under the trade name of "YE5822 Liquid A" | 18.2 | 24.5 |
| Silicone rubber Liquid B; available from GE Toshiba Silicone Co., Ltd. under the trade name of "YE5822 Liquid B" | 1.8 | 2.5 |
| Alumina powder | 80.0 | 73.0 |
| Retarder: Dimethyl maleate, available from Kanto Chemical Co., Ltd. (Extra Pure Reagent) | 0.01 (with respect to the total amount of Liquid A + Liquid B) | |

TABLE 7

|  | Heat Conductivity (W/mK) | Viscosity (mPa · s) | Abrasive Wear of Mold (mg) |
|---|---|---|---|
| Ex. 4 | 2.8 | 140,000 | 1.5 |
| Comp. Ex. 5 | 1.6 | 142,000 | 1.5 |
| Ref. Ex. 1 | Not moldable | Not measurable | 6.5 |

TABLE 8

|  | Heat Conductivity (W/mK) | Viscosity (mPa · s) | Abrasive Wear of Mold (mg) |
|---|---|---|---|
| Ex. 5 | 1.9 | 176,000 | 0.10 |
| Comp. Ex. 6 | 0.9 | 176,000 | 0.10 |
| Ref. Ex. 2 | Not moldable | Not measurable | 0.25 |

As will be clear from the comparison of Examples with Comparative Examples, the resin compositions and the heat-radiating members prepared using the alumina powder according to the present invention were found to be ones each having a high heat conductivity, excellent flow properties and a low abrasive wear of mold.

INDUSTRIAL APPLICABILITY

The alumina powder according to the present invention can be used, for instance, as a filler for a resin composition used for sealing a semiconductor and a filler for a heat-radiating member. Moreover, the heat-radiating member prepared using the spherical α-alumina powder of the present invention can be used, for instance, as a heat-radiating sheet or a heat-radiating spacer when assembling electronic machinery and tools.

BRIEF DESCRIPTION OF THE DRAWINGS

FIG. 1 is a diagram for illustrating an embodiment of the device used in the practice of the production method according to the present invention.

DESCRIPTION OF LETTERS OR NUMERALS

1 Raw material-supply port;
2 Burner;
3 Combustion gas-supply port;
4 Combustion-improving gas-supply port;
5 Furnace;
6 Heating device;
7 Combustion gas-supply pipe;
8 Combustion-improving gas-supply pipe;
9 Collecting device;
10 Blower;
A, B, C Point of measurement of temperature.

What is claimed is:

1. α-alumina powder having an average sphericity of not less than 0.93 and a content of α-crystalline form of not less than 95%.

2. The α-alumina powder as set forth in claim 1, wherein the average sphericity is not less than 0.95.

3. The α-alumina powder as set forth in claim 1, wherein the content of α-crystalline form is 100%.

* * * * *